United States Patent [19]
Kondo et al.

[11] Patent Number: 5,648,966
[45] Date of Patent: Jul. 15, 1997

[54] METHOD OF SENDING AN ALARM TO A NETWORK MANAGEMENT STATION WHEN AN UNUSUAL EVENT OCCURS IN A MANAGED NETWORK STATION

[75] Inventors: Kenji Kondo; Atsushi Kara; Akifumi Yonehara, all of Tokyo, Japan

[73] Assignee: NEC Corporation, Tokyo, Japan

[21] Appl. No.: 531,947

[22] Filed: Sep. 21, 1995

[30] Foreign Application Priority Data

Sep. 21, 1994 [JP] Japan .................................. 6-225443

[51] Int. Cl.$^6$ .................................................. H04L 12/26
[52] U.S. Cl. ........................................................ 370/245
[58] Field of Search ..................................... 340/533, 505, 340/531, 825.08, 825.54, 825.16, 895.13; 455/3; 370/85.13, 13, 14, 241, 245, 242, 401, 402, 244, 491, 524

[56] References Cited

U.S. PATENT DOCUMENTS

| | | | |
|---|---|---|---|
| 4,494,111 | 1/1985 | Rocci et al. | 340/533 |
| 5,412,709 | 5/1995 | Jarvis et al. | 379/28 |

OTHER PUBLICATIONS

"SNMP, SNMPv2, and CMIP: The Practical Guide to Network-Management Standards" by William Stallings, published by Addison-Wesley Publishing Co., pp. 488-492.

Primary Examiner—Douglas W. Olms
Assistant Examiner—Ajit Patel
Attorney, Agent, or Firm—Sughrue, Mion, Zinn, Macpeak & Seas

[57] ABSTRACT

A technique is disclosed for sending alarm information to a network management station from at least one of a plurality of network stations wherein an unusual event(s) has occurred. The network stations are located in a wide area network and are managed by the network management station using a control path. An occurrence of an unusual event is detected in the at least one of the plurality of network stations. Following this, alarm information is generated in the network station wherein the unusual event has occurred. The alarm information includes address information for specifying the network station. Subsequently, the alarm information is sent using an alarm path, which is dedicated to transmission of the alarm information, to the network management station.

12 Claims, 7 Drawing Sheets

D : USER DATA PACKET
M : CONTROL PACKET
A : ALARM PACKET

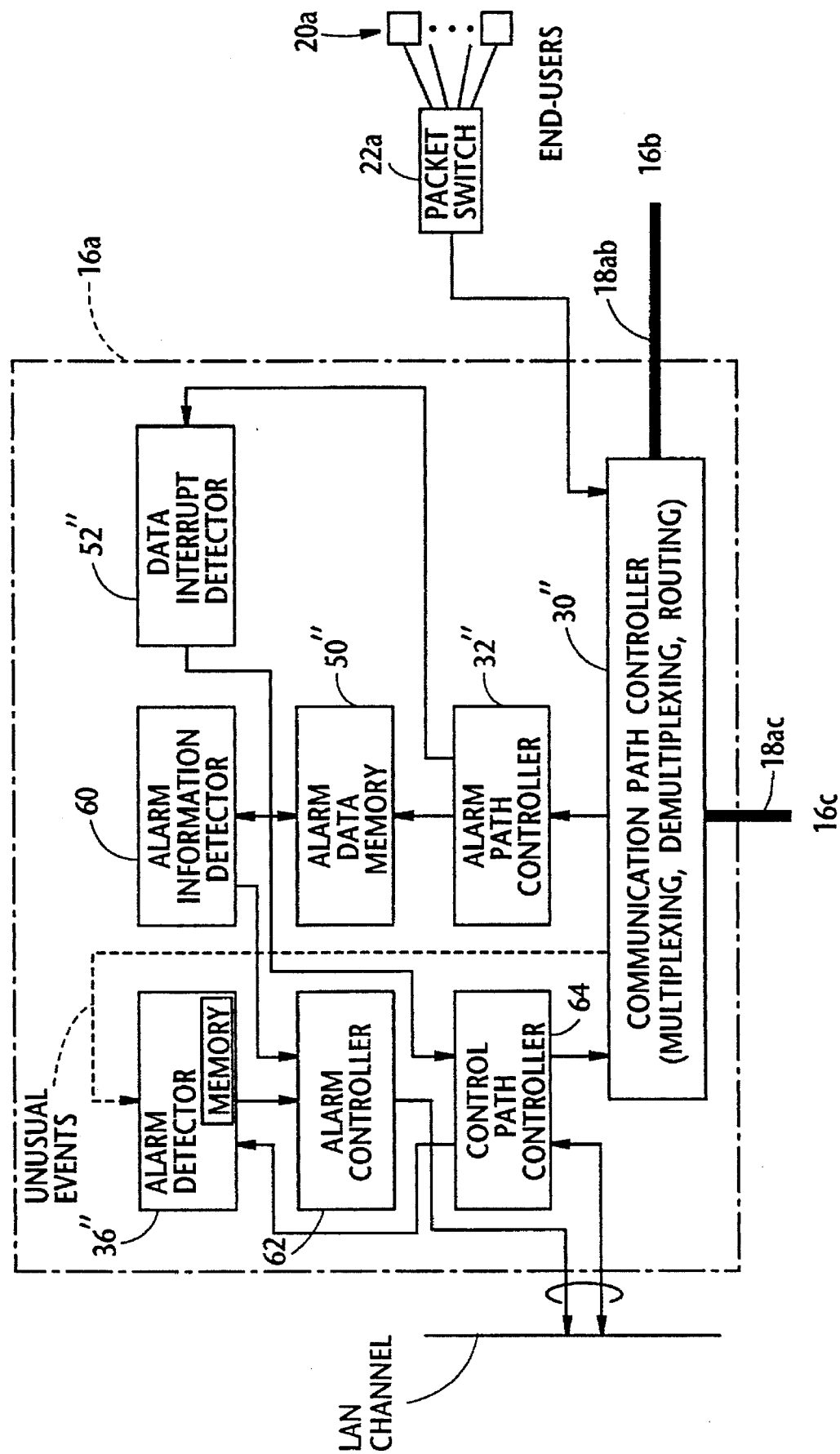

MEMORY FORMAT & CONTENT OF ALARM DATA MEMORIES 50 & 50″

METHOD OF SENDING AN ALARM TO A NETWORK MANAGEMENT STATION WHEN AN UNUSUAL EVENT OCCURS IN A MANAGED NETWORK STATION

BACKGROUND OF THE INVENTION

1. Field of the Invention

The present invention relates to a method of sending an alarm to a network management station when an unusual event occurs in one of a plurality of managed network stations in a wide area network (WAN). The present invention finds an extensive use in a wide area network such as a TCP/IP (transmission-control protocol/internet protocol) based network wherein a network delay is considerably large compared with a LAN (local area network). The present invention is able to effectively solve congestion problems of a conventional control path thereby achieving substantial savings of network capacity.

2. Description of the Related Art

It is known in the art that information that is useful for purposes of network controlling is collected and stored by each of a plurality of managed stations and made available to a network management station. The information stored in the managed stations are automatically sent in packets to the network management station via the control path. Thus, when unusual events occur in many managed stations essentially at the same time, there is a possibility that the control path may be congested.

In order to address such a problem, it is proposed to make use of a technique known as polling on demand. In more specific terms, when an alarm is generated in a given managed station, the managed station issues a poll request packet for requesting the network management station to send a polling signal instead of automatically sending the unusual events to the management station. When the managed station is polled, it reports the abnormal events to the network management station.

Alarms are specific types of notifications concerning detected faults or abnormal conditions. Information that is included in the alarm is a loss of signal, a power problem, a timing problem, a high/low ambient temperature, high/low humidity, toxic gas, etc. For more information concerning the alarms, reference should be made to a book entitled "SNMP, SNMPv2, and CMIP: The Practical Guide to Network-Management Standards" by William Stallings, published by Addison-Wesley Publishing Company, One Jacob Way, Reading, Mass. 01857, pages 488–492.

The aforesaid related art has encountered the problem in that if the poll request packet is lost during the transmission to the management station, the managed station must resend a poll request after a predetermined time period. This leads to the problem that the collection of the unusual events is undesirably delayed.

What is desired is an improved technique for avoiding the possibility of a long delay in reporting an alarm to the network management station in a wide area network.

SUMMARY OF THE INVENTION

It is an object of the present invention to provide a method of improving network operation efficiency by providing a dedicated alarm path in a wide area network.

These objects are fulfilled by a technique for sending alarm information to a network management station from at least one of a plurality of network stations wherein an unusual event(s) has occurred. The network stations are located in a wide area network and are managed by the network management station using a control path. An occurrence of an unusual event is detected in the at least one of the plurality of network stations. Following this, alarm information is generated in the managed network station wherein the unusual event has occurred. The alarm information includes address information for specifying the network station. Subsequently, the alarm information is sent using an alarm path, which is dedicated to transmission of the alarm information, to the network management station.

More specifically, an aspect of the present invention resides in a method of sending alarm information to a network management station from at least one of a plurality of network stations wherein an unusual event has occurred, the plurality of network stations being located in a wide area network and being managed by the network management station by,ray of a control path, the method comprising the steps of: (a) detecting an occurrence of an unusual event in the at least one of the plurality of network stations; (b) generating alarm information in the at least one of the plurality of network stations, the alarm information including address information for specifying the at least one of the plurality of network stations; and (c) sending the alarm information using an alarm path, which is dedicated to transmission of the alarm information, to the network management station.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 4($b$) is a sketch schematically showing the meaning of five bits from the least significant bit of a bit pattern;

FIG. 7 is a block diagram showing in detail still another managed network station of FIG. 1; and FIGS. 8($a$) through 8($d$) are diagrams showing memory formats and contents of alarm data memories of FIGS. 5–7.

DETAILED DESCRIPTION OF THE PREFERRED EMBODIMENTS

A preferred embodiment of the present invention is discussed with reference to FIGS. 1–8($d$).

Figure 1:
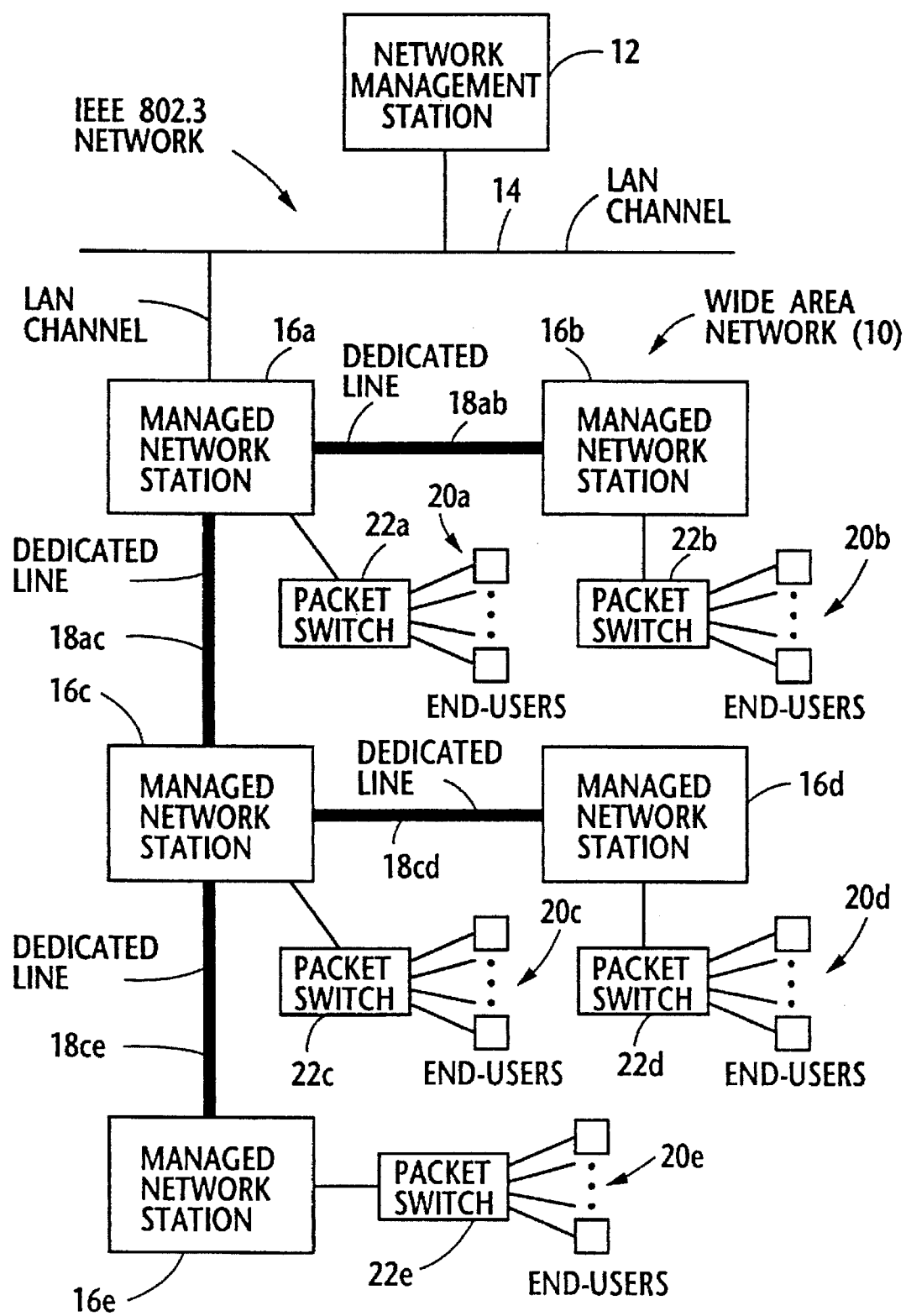
FIG. 1 is a diagram schematically showing a topology of two networks to which the present invention is applied.

FIG. 1 is a diagram schematically showing a wide area network (WAN) 10 which is connected to an IEEE 802.3 network by way of an appropriate gateway (not shown). The IEEE 802.3 network is a LAN (local area network) which is known as the Ethernet. A network management station 12, coupled to a LAN channel 14, is provided to manage a plurality of network stations 16$a$–16$e$ in the WAN 10. As shown, the managed network stations 16$a$–16$e$ are coupled with each other through a plurality of dedicated lines 18ab, 18ac, 18cd, and 18ce.

A plurality of end-users (viz., terminal units) 20a are coupled to the managed network station 16a via a packet switch 22a. In a similar manner, other end-users 20b, 20c, 20d, and 20e are coupled to the managed network stations 16b–16e via packet switches 22b, 22c, 22d, and 22e, respectively. Thus, each of the end-users 20a (for example) is able to exchange data within the same group via the packet switch 22a. Further, two given end-users in different groups are able to communicate with each other by way of the corresponding managed network stations using data paths in the corresponding dedicated lines. A bit rate of each dedicated line is 64 kbps (for example) which is considerably low compared with a bit rate in the IEEE 802.3 network (10 Mbps (for example)).

Figure 2:
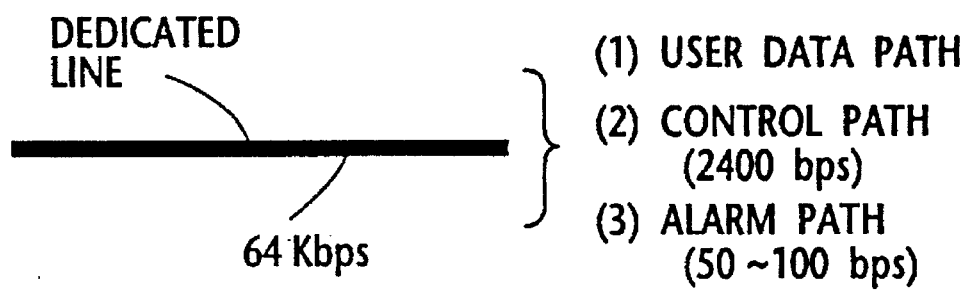
FIG. 2 is a sketch schematically showing three information paths included in each of dedicated lines of FIG. 1.

FIG. 2 is a sketch schematically showing three paths included in each dedicated line. The three paths are a user data path a control path, and an alarm path. As mentioned above, the bit rate of each dedicated line is as low as 64 kbps (for example). It is understood that the bit rate which can be allocated to the user data path depends on the bit rates shared to the control and alarm paths. If the control and alarm paths are respectively assumed to have data transmission rate of 2400 bps and 100 bps, the bit rate of the user data path becomes 61.5 kbps.

The present invention resides in the provision of the alarm path with a very slow bit rate in a manner which does not adversely affect the user data transmission. It is to be noted that the bit rate of the alarm path is in no way limited to the transmission rate of 50–100 bps shown in FIG. 2.

Figure 3:
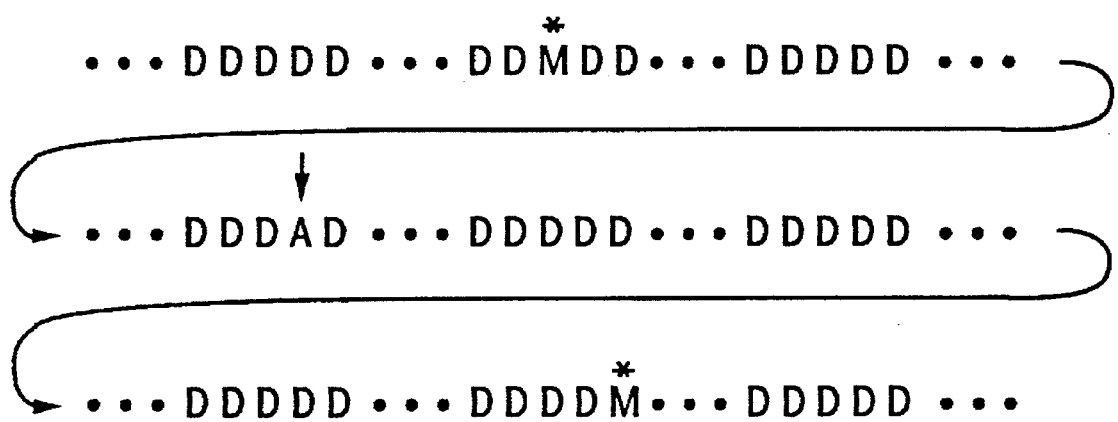
FIG. 3 is a sketch schematically showing a packet flow in each of the dedicated line of FIG. 1.
Figure 4:
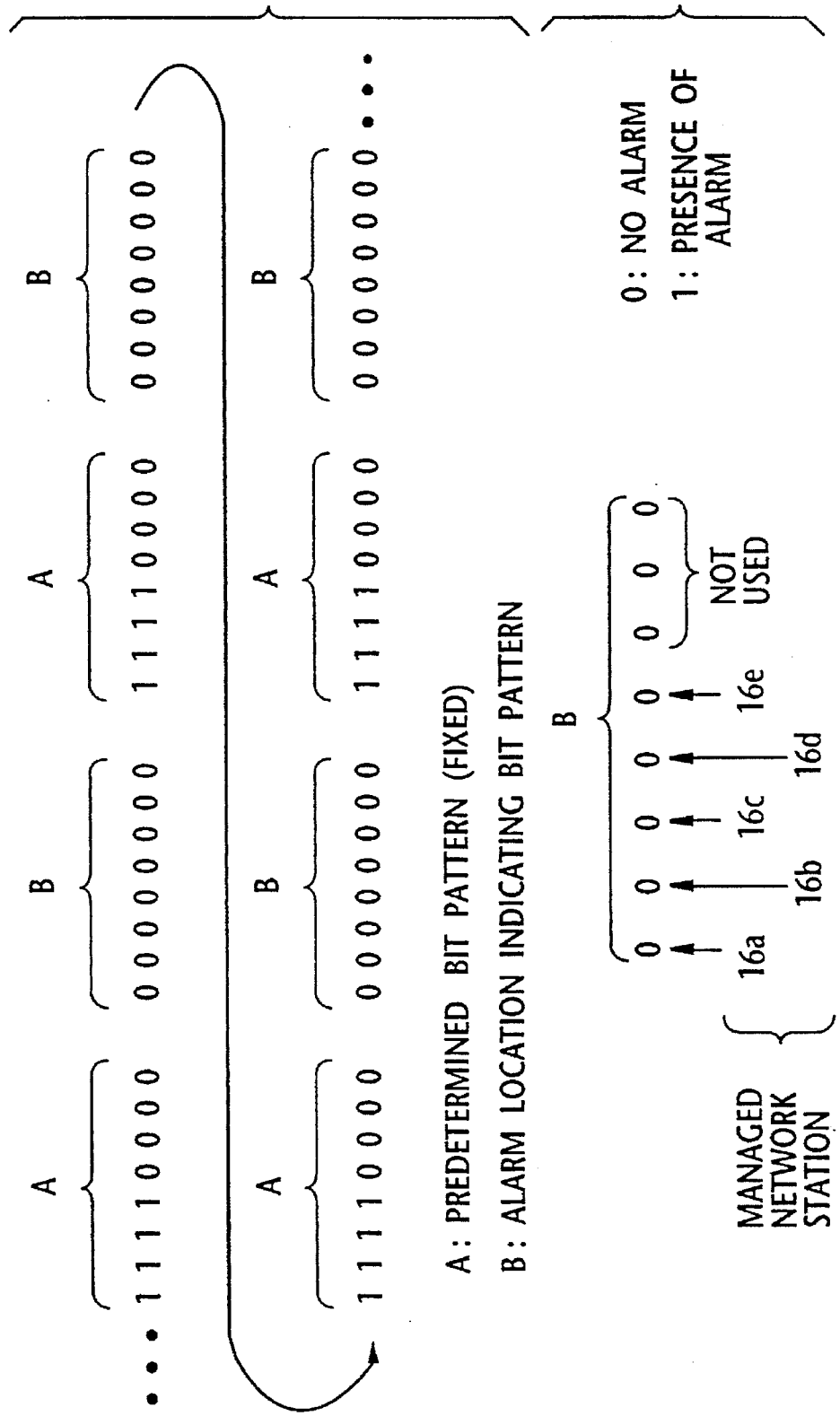
FIG. 4($a$) is a sketch schematically showing bit patterns of an alarm packet.

FIG. 3 is a schematic illustration showing an example of a packet data flow in each of the dedicated lines 18ab, 18ac, 18cd, and 18ce. The capital letters D, M, and A respectively denote a user data packet, a control packet, and a alarm packet. As shown, the control and alarm packets (highlighted by * and a down arrow respectively) are inserted (provided) in the user data packet flow.

The operations of the present invention are described.

FIG. 4(d) is a schematic diagram showing a data format of the alarm packet which is transmitted via the alarm path. As shown, the alarm packet includes a plurality of bit patterns A and B which are alternately transmitted. The bit pattern A is fixed to "11110000" (for example) and is used for packet identifying and synchronization purposes. The bit pattern B is an alarm location indicating bit pattern which designates the managed network station(s) (16a–16e) which has generated an alarm as shown in FIG. 4(a). That is, the five bits from the least significant bit are respectively allocated to the managed network stations 16a, 16b, 16c, 16d, and 16e. The upper three bits are not used in the present embodiment. As shown, the bit 0 at each of the lower five bit positions indicates "no alarm" while the bit 1 indicates "presence of alarm".

Figure 5:
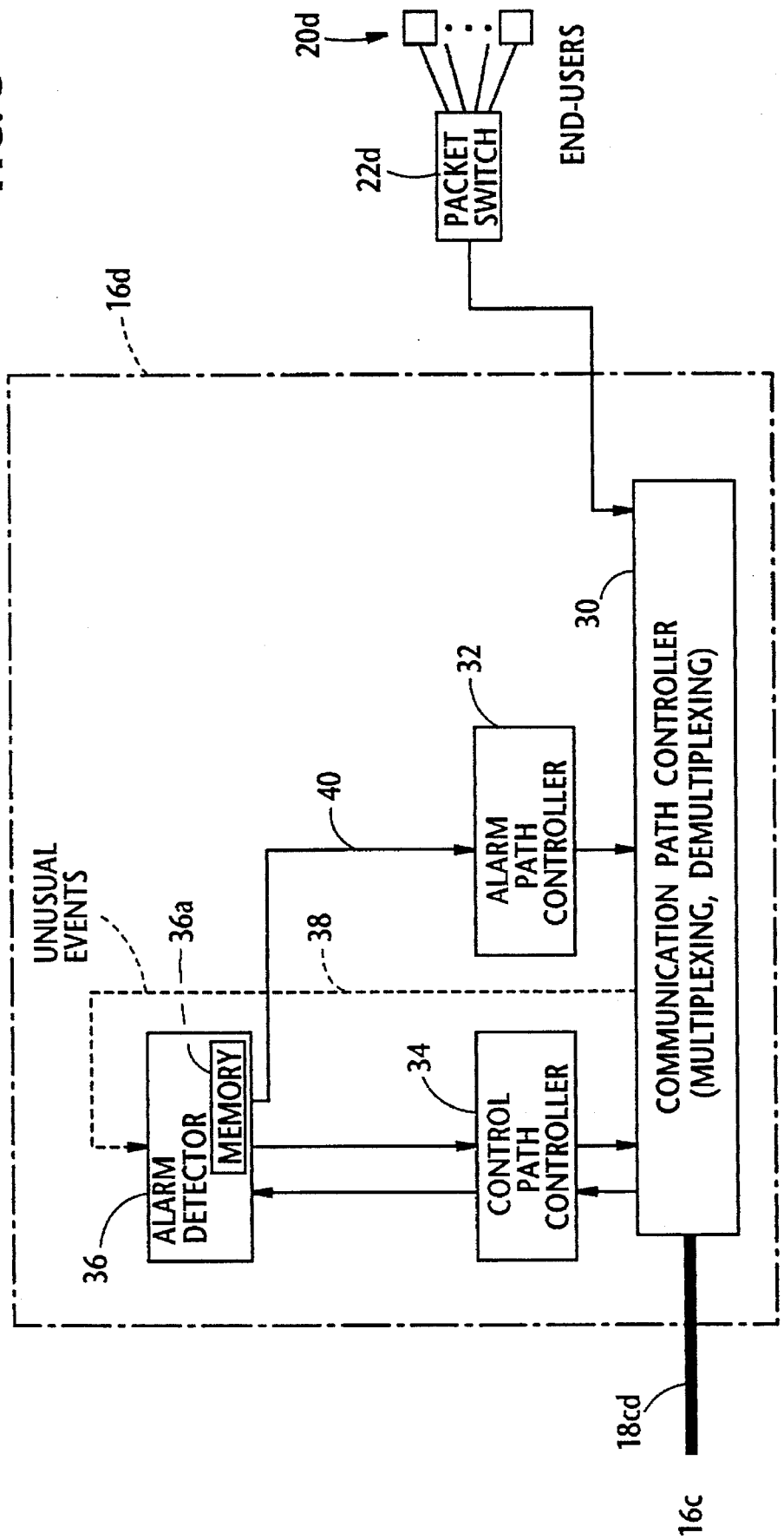
FIG. 5 is a block diagram showing in detail one managed network station of FIG. 1.

FIG. 5 is a block diagram showing in detail the configuration of the managed network station 16d.

As shown, a communication path controller 30 is operatively coupled to the packet switch 22d, an alarm path controller 32, and a control path controller 34. The communication path controller 30 operates to multiplex incoming packets from the blocks 22d, 32, and 34 and also to demultiplex the control packets applied via the dedicated line 18cd from the station 16c (not shown). The alarm path controller 32 constantly generates the alarm packets (see FIG. 4(a)) of FIG. 4) at a predetermined rate irrespective of whether or not an alarm is generated therefrom.

An alarm detector 36 is coupled, via a line 38, to the communication path controller 30 in order to detect an unusual event(s) of the type referred to in the opening paragraphs of the instant disclosure, which has occurred in the controller 30. When the alarm detector 36 detects the occurrence of the unusual event, the detector 36 informs the alarm path controller 32 of the happening of the event via a line 40. At the same time, the alarm detector 36 acquires the data (content) of the event and stores the same in a memory 36a. The control path controller 34 will further be described later.

Figure 6:
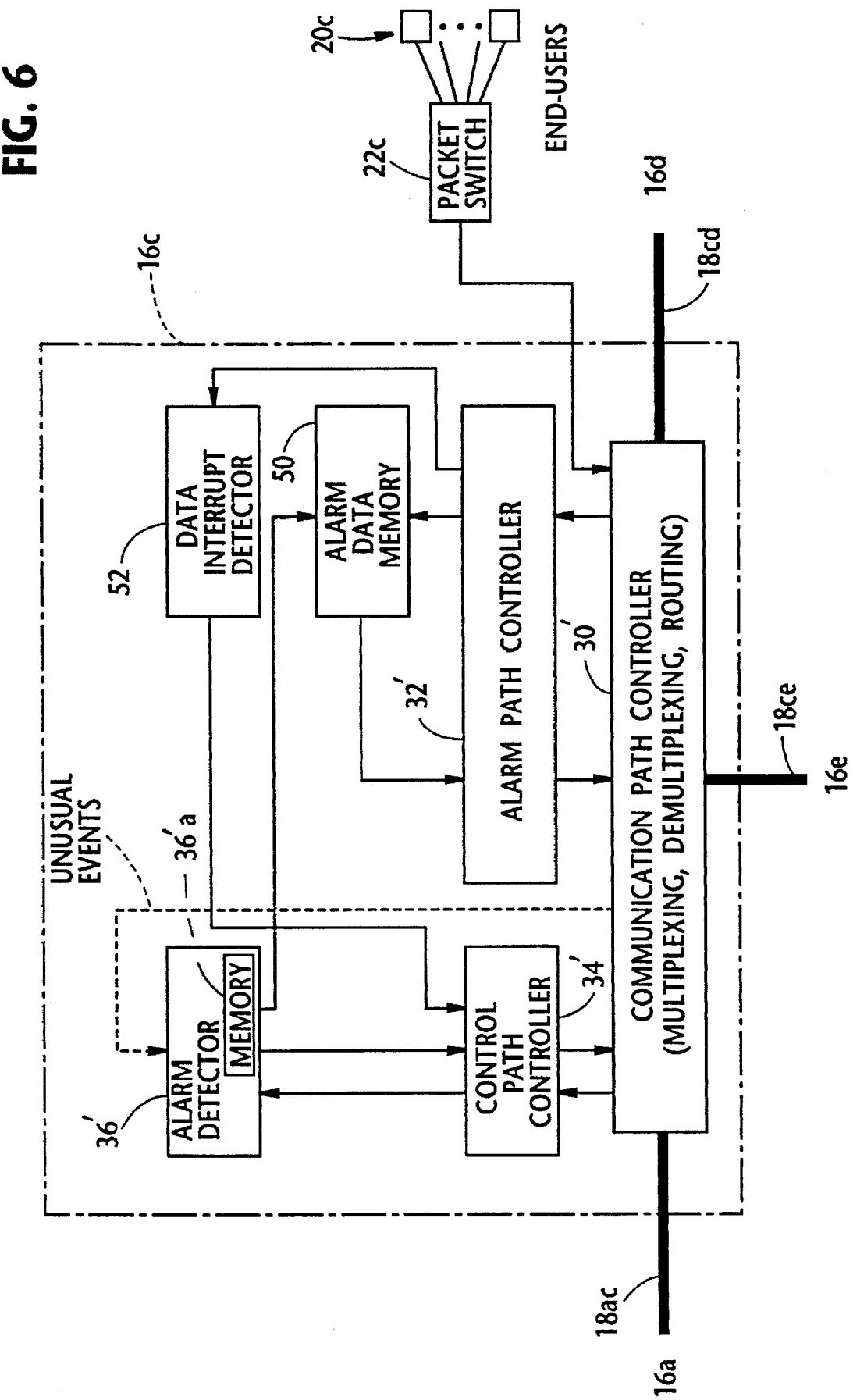
FIG. 6 is a block diagram showing in detail another managed network station of FIG. 1.

Referring to FIG. 6, wherein the managed network station 16c is shown in detail. For the sake of simplifying the description, the portions of FIG. 6, which respectively correspond to those of FIG. 5, are labelled same reference numerals with a prime (').

As shown, a communication path controller 30' is operatively coupled to the packet switch 22c, an alarm path controller 32', and a control path controller 34'. The communication path controller 30' operates in exactly the same manner in terms of the multiplexing and demultiplexing. However, the controller 30' has an additional function of data routing. This is because the packets applied to the controller 30' should be routed to a correct destination. The packet routing technique is well known in the art and hence further description thereof is omitted for brevity.

The communication path controller 30' extracts (demultiplexes) the alarm packets transmitted from the station 16d and further extracts the alarm location indicating bit patterns B (see FIGS. 4(a) and 4(b)). These bit patterns B are successively applied to an alarm data memory 50 which has a memory format shown in FIG. 8(a) and which has previously been reset (all zero). The memory 50 implements OR operations on the already stored bit pattern and a newly inputted bit pattern on a bit-by-bit basis. It is assumed that the managed network station 16d (FIG. 5) generates no alarm in this embodiment.

When an alarm detector 36' detects an unusual event which has occurred in the communication path controller 30', the detector 36' applies a bit pattern shown in FIG. 8(b). Thus, the content of the alarm data memory 50 becomes as indicated in FIG. 8(c). The alarm path controller 32' periodically retrieves the content (viz., alarm location bit pattern (B)) of the memory 50 and sends it toward the station 16a via the communication path controller 30'. A data interrupt detector 52 and a control path controller 34' are discussed in detail later.

Referring to FIG. 7, wherein the managed network station 16a is shown in detail. As in the above case, for the sake of simplifying the description, the portions of FIG. 7, which respectively correspond to those of FIG. 6, are labelled same reference numerals with a notation (").

As shown, a communication path controller 30" is operatively coupled to the packet switch 22a, an alarm path controller 32", and a control path controller 64. The communication path controller 30" operates in essentially the same manner as the counterpart 30' of FIG. 6.

The communication path controller 30" extracts (demultiplexes) the alarm packets transmitted from the station 16b and further extracts the alarm location indicating bit patterns each of which exhibits the bit pattern shown in FIG. 8(c).

As in the case of FIG. 6, it is necessary for the communication path controller 30" to extract alarm location indicating bit patterns B transmitted from the station 16b. However, for the purpose of simplifying the discussion, it is assumed that each of the alarm location bit patterns from the station 16b exhibits all zero.

The alarm path controller 32" successively applies the bit patterns B from the station 16c to an alarm data memory 50". In this instance, each of the bit patterns B takes the form as shown in FIG. 8(d) and hence, the memory 50" which has previously been reset exhibits the bit pattern shown in FIG. 8(d).

An alarm information detector 60 accesses the memory 50" in order to ascertain if any of the station(s) has generated the alarm. In this case, the detector 60 determines that the managed network station 16c issued the alarm. Following this, the detector 60 advises an alarm controller 62 of the above mentioned information. Accordingly, the alarm controller 62 transmits the alarm information (viz., the occurrence of the alarm and data indicating of the station 16c which issues the alarm) to the network management station 12 (FIG. 1) via the LAN channel 14.

The network management station 12, in response to the aforesaid alarm information from the station 16a, sends a data request (denoted by DR), for collecting the unusual event data, toward the station 16c which has generated the alarm. The data request DR contains destination data. The control path controller 64 of the station 16a is supplied with the data request DR and checks to see if the request DR is directed thereto. In this case, the data request DR is not directed to the station 16a and thus, the control path controller 64 packetizes the data request DR and applies the packetized data (denoted by DR') to the communication path controller 30". Thus, the data request packet is routed to the station 16c.

The communication path controller 30' demultiplexes (extracts) the data request packet DR' and applies the same to the control path controller 34' which determines that the packet DR' is addressed to the station 16c and which applies a data retrieve request to the alarm detector 36'. Thus, the unusual event stored in the memory 36'a is outputted to the control path controller 34' which packetizes the retrieved event data and sends it toward the network management station 12 (FIG. 1).

It is readily understood that if the data request packet DR' is directed to the station 16d, the control path controller 34' returns the packet DR' to the controller 30' as in the case of the counterpart 64 of FIG. 7. Further, the operations of the control path controller 34 are easily understood from the foregoing.

Returning to FIG. 6, the data interrupt detector 52 is coupled to the alarm path controller 32'. As mentioned above, the alarm packets are constantly transmitted within the wide area network 10 (FIG. 1) irrespective of whether or not an alarm(s) is generated in any of the stations 16a–16e. Therefore, if the communication is interrupted between the stations 16c and 16d, the data interrupt detector 52 is able to detect such a data interruption based on the interruption of the alarm packet transmission from the station 16d. In such a case, the detector 52 informs the control path controller 34' of the data (communication) interruption. The controller 34' responds to the data interruption advice and sends an interruption report to the network management station 12 via the control path and the station 16a. Therefore, the station 12 sends a communication cut-off instruction to the station 16c.

It will be understood that the above disclosure is representative of only one possible embodiment of the present invention and that the concept on which the invention is based is not specifically limited thereto.

What is claimed is:

1. A method of sending alarm information to a network management station from at least one of a plurality of network stations wherein an unusual event has occurred, said plurality of network stations being located in a wide area network and being managed by said network management station by way of a control path, said method comprising the steps of:

(a) detecting an occurrence of an unusual event in said at least one of said plurality of network stations;
   (b) generating alarm information in said at least one of said plurality of network stations, said alarm information including address information for specifying said at least one of said plurality of network stations; and
   (c) sending said alarm information using an alarm path, which is dedicated to transmission of said alarm information, to said network management station.

2. A method as claimed in claim 1, wherein said address information includes a sequence of bits which respectively specify said plurality of network stations.

3. A method as claimed in claim 1, wherein said network management station is responsive to said alarm information and generates a data collection request for collecting data of said unusual event, said data collection request being forwarded to said at least one of said plurality of network stations using said control path.

4. The method of sending alarm information as claimed in claim 1 wherein the alarm path is provided with a very slow bit rate.

5. The method of sending alarm information as claimed in claim 1 wherein the alarm information packets are constantly generated by the plurality stations regardless of whether the stations detect an unusual event.

6. The method of sending alarm information as claimed in claim 1 wherein each one of said plurality of work stations comprises a communication path controller operatively coupled to an alarm path controller and a control path controller.

7. The method of sending alarm information as claimed in claim 1 wherein said step of generating alarm information is performed at a predetermined rate irrespective of whether or not an alarm is generated therefrom. The method of sending alarm information as claimed in claim 2 wherein the alarm path is provided with a very slow bit rate.

8. The method of sending alarm information as claimed in claim 2 wherein the alarm information packets are constantly generated by the plurality of networks stations regardless of whether the stations detect an unusual event.

9. The method of sending alarm information as claimed in claim 2 wherein each one of said plurality of work stations a communication path controller operatively coupled to an alarm path controller and a control path controller.

10. The method of sending alarm information as claimed in claim 3 wherein the alarm path is provided with a very slow bit rate.

11. The method of sending alarm information as claimed in claim 3 wherein the alarm information packets are constantly generated by the plurality of networks stations regardless of whether the stations detect an unusual event.

12. The method of sending alarm information as claimed in claim 3 wherein each one of said plurality of work stations comprises a communication path controller operatively coupled to an alarm path controller and a control path controller.

* * * * *